US007181871B2

(12) United States Patent
Sower

(10) Patent No.: US 7,181,871 B2
(45) Date of Patent: Feb. 27, 2007

(54) SLUDGE HARVESTER FOR REMOVING SLUDGE FROM SLUDGE PONDS

(75) Inventor: Larry P. Sower, Albany, MO (US)

(73) Assignee: Crystal Park Technologies, LLC, Kansas City, MO (US)

( * ) Notice: Subject to any disclaimer, the term of this patent is extended or adjusted under 35 U.S.C. 154(b) by 154 days.

(21) Appl. No.: 10/806,802

(22) Filed: Mar. 23, 2004

(65) Prior Publication Data

US 2005/0211637 A1    Sep. 29, 2005

(51) Int. Cl.
*E02F 3/00* (2006.01)
(52) U.S. Cl. .............................. 37/343; 37/324; 37/317
(58) Field of Classification Search .................. 37/342, 37/343, 326, 332, 337, 338, 317, 324, 320
See application file for complete search history.

(56) References Cited

U.S. PATENT DOCUMENTS

| 281,905 | A | * | 7/1883 | Meinesz ....................... 37/342 |
| 308,211 | A | * | 11/1884 | Stanke ......................... 37/342 |
| 526,675 | A | * | 10/1894 | Bernard ..................... 172/26.6 |
| 1,062,924 | A | * | 5/1913 | Mercer ......................... 37/342 |
| 1,192,127 | A | * | 7/1916 | Shostrom ................... 172/26.6 |
| 1,503,680 | A | * | 8/1924 | Baer ............................. 37/342 |
| 3,276,152 | A | * | 10/1966 | Knap ............................ 37/400 |
| 4,818,390 | A | * | 4/1989 | Manchak, Jr. .............. 210/170 |
| 4,957,622 | A | * | 9/1990 | Mims ........................ 210/170 |
| 5,262,064 | A | * | 11/1993 | El-Shall ..................... 210/728 |
| 5,282,694 | A | * | 2/1994 | Kovacs et al. ................ 405/36 |
| 5,293,887 | A | * | 3/1994 | Thibodeaux .................. 134/24 |
| 5,545,326 | A | * | 8/1996 | Petering ..................... 210/605 |
| 5,960,570 | A | * | 10/1999 | Satzler ......................... 37/337 |
| 6,119,375 | A | * | 9/2000 | Wilson et al. ................ 37/195 |
| 6,209,965 | B1 | * | 4/2001 | Borns et al. ................... 299/8 |
| 6,306,309 | B2 | * | 10/2001 | Ekenback et al. .......... 210/787 |
| 6,409,788 | B1 | | 6/2002 | Sower |
| 6,470,828 | B1 | | 10/2002 | Townsend et al. |
| 6,497,741 | B2 | | 12/2002 | Sower |
| 6,508,078 | B2 | | 1/2003 | Sower |
| 6,682,578 | B2 | | 1/2004 | Sower |
| 6,769,885 | B2 | * | 8/2004 | Guta ........................... 417/474 |
| 6,863,826 | B2 | * | 3/2005 | Sheets ........................ 210/705 |
| 2003/0172697 | A1 | | 9/2003 | Sower |

OTHER PUBLICATIONS

Deal offers hope for less smelly farms, Kansas City Star, www.kansascity.com, Feb. 22, 2004.

(Continued)

*Primary Examiner*—Victor Batson
(74) *Attorney, Agent, or Firm*—Workman Nydegger

(57) ABSTRACT

A sludge harvester for removing a concentrated nutrient sludge from a sludge pond includes a frame, one or more wheels or skids attached to the frame, means for gently breaking up at least a portion of the sludge layer adjacent to a dilute layer, and means for capturing at least a portion of the broken up sludge layer. The organic sludge product recovered by the harvester has a higher nutrient concentration as compared to alternative methods because of minimized mixing of the sludge and dilute layers during collection of the organic sludge product. The organic sludge product captured by the harvester can be applied directly to agricultural land or used in the production of a certifiable organic or other fertilizer.

22 Claims, 6 Drawing Sheets

OTHER PUBLICATIONS

"Utah Bio-Cap ML® Effectiveness Study", Jan. 2003, Baumgartner Environics, Inc.

Bill Graham, "Hog Producer Must Cut Odors, Pollution," Kansas City Star, www.kansascity.com, Feb. 18, 2004.

Susan Mires, "Firm Refines Method of Processing Manure," St. Joseph News-Press Online, www.stjoenews-press.com, Feb. 18, 2004.

Susan Mires, "PSF Finds Clean Use for Hog Waste," St. Joseph News-Press Online, www.stjoenews-press.com, Feb. 18, 2004.

Saqib Mukhtar and Jerry D. Walker, "Closure of Lagoons and Earthen Manure Storage Structures," Agricultural Communications, The Texas A&M University System, http://taserc.tamu.edu, Aug. 2002.

Jay Nixon, "A Stinky Cleanup Job in Missouri," Kansas City Star, www.kansascity.com, Mar. 1, 2004.

* cited by examiner

SLUDGE HARVESTER FOR REMOVING SLUDGE FROM SLUDGE PONDS

BACKGROUND OF THE INVENTION

1. The Field of the Invention

The present invention relates generally to removal of organic-based wastes from sludge ponds. More specifically, the present invention relates to devices for removing sludge from sludge ponds, which sludge may then be directly applied to agricultural land, or used to produce organic fertilizers by processing the organic-based sludge.

2. The Relevant Technology

Feedlots, animal barns, municipal sewage, and farms that keep large numbers of animals are sources of enormous quantities of organic waste. The expression "organic waste source" will hereinafter refer to any of these sources of organic waste or to any source that similarly produces organic waste, although perhaps in different quantities or by different activities.

The disposal of untreated organic waste causes serious pollution problems which include those due to the waste's high content of chemically oxidizable components and biochemically decomposable components. When these pollutants reach bodies of water, either because they leach from disposal sites or as a consequence of being directly released or transported into water bodies, they deoxygenate the receiving waters and impair the receiving waters' capability to support aquatic life.

Acridity and high pathogen content present additional problems of untreated waste disposal. Acrid gases released into the atmosphere are not only unpleasant but they can also contribute to acid deposition, global greenhouse effects, and ozone depletion.

Organic waste that is left to run off into adjacent bodies of water or onto adjacent land is generally high in nitrogen and phosphorous, and has been linked to various dangerous toxic microorganisms.

In hog and cattle raising operations, water is typically used to flush waste out of barns and into storage facilities, thus producing a slurry that can be up to 97% liquid. The flushed waste is typically stored in earthen sludge ponds, sometimes referred to as lagoons. Most of the solids (including as much as 90% of the phosphates) settle as part of the sludge layer at the bottom of the pond. A large percentage of the nitrogen and potassium nutrients are entrained as soluble salts within the sludge layer. A relatively small percentage of these nutrients remains dissolved in the dilute layer, while some of the nitrogen also volatilizes into the atmosphere.

Sludge ponds have a limited useful life, and eventually must be cleaned out by removing the liquids along with the sludge layer. In addition, because of the high costs and environmental disadvantages of operating large sludge ponds, there has recently been increased pressure to use alternative treatment techniques that either require smaller lagoons or no lagoons at all.

In an attempt to recoup some of the cost of cleaning out such lagoons, methods and apparatus have been developed to retrieve some nutrient value of the organic waste, which can be used as a fertilizer. One method for retrieving some nutrient value of the organic waste in sludge ponds involves pumping the liquid out while agitating the sludge layer at pumping time to capture the nutrients that otherwise would remain behind in the lower settled layers. This slurry is then applied to agricultural land, often turning or knifing it into the soil. Because the sludge layer is mixed with the liquid dilute layer, the retrieved mixture has a relatively low nutrient concentration.

Another method involves dredging the sludge layer, which is then air-dried and then applied to agricultural land. Dredges operate at relatively high flow rates (e.g., 700–800 gpm). With current dredges and at these rates, there is a great deal of turbulence, vortexing, and mixing created between the sludge layer and the dilute layer, which results in column mixing of the layers. Mixing of these layers lowers the concentration of nutrients within the retrieved mixture.

In addition, each of these methods and apparatus involve relatively high equipment and operational costs. The cost of equipment and operation is often exacerbated because in many cases the animal raising operation is closing because of financial difficulties.

It would be an improvement in the art to provide a device and method that could be used to efficiently and inexpensively remove a high nutrient sludge product from sludge ponds, which sludge could then be either directly applied to agricultural land or used to produce a certifiable organic or other fertilizer.

BRIEF SUMMARY OF THE INVENTION

The present invention is directed to a sludge harvester for removing a concentrated nutrient sludge from sludge ponds. The harvester is intended to be relatively inexpensive from an equipment cost perspective, as well as relatively inexpensive to operate, while allowing the user to retrieve a high nutrient sludge product from sludge ponds so as to yield a valuable fertilizer product.

According to one embodiment, the sludge harvester comprises a frame, one or more wheels or skids attached to the frame, means for gently breaking up at least a portion of a sludge layer adjacent to a dilute layer, and means for capturing at least a portion of the broken up sludge layer.

The means for gently breaking up at least a portion of the sludge layer may comprise any mechanical device capable of gently breaking up a portion of the sludge layer. According to one embodiment, the means for gently breaking up at least a portion of the sludge layer comprises a pin mixer, an auger, or a rake. The means for gently breaking up a portion of the sludge layer is intended to just break up the surface of the sludge layer without overly agitating the material of the sludge layer with the adjacent liquid dilute layer. By keeping agitation to a minimum, the nutrient value of the recovered product is maintained at a high level.

The means for capturing at least a portion of the broken up sludge layer may comprise any mechanical device capable of capturing the concentrated nutrient layer. According to one embodiment, the means for capturing at least a portion of the broken up sludge layer may comprise a pump (e.g., a positive displacement pump). Because the sludge layer is gently broken up and over agitation is undesirable, the pump preferably removes the sludge at a reduced rate as compared to alternative devices and techniques. According to one embodiment, the pump retrieves about 100 gallons per minute (gpm). For comparison sake, traditional dredging devices operate at about 800 gpm, resulting in greatly increased agitation. The increased agitation results in retrieval of a lower concentration of nutrients. In general, the pump will preferably retrieve about 200 gpm or less, more preferably about 150 gpm or less, and most preferably about 100 gpm or less.

According to one embodiment, the frame of the harvester includes a plurality of sideboards to further reduce turbulence and column mixing between the sludge layer and the dilute layer. Sideboards also substantially prevent vortexing of the dilute layer into the pump.

These and other benefits, advantages and features of the present invention will become more fully apparent from the following description and appended claims, or may be learned by the practice of the invention as set forth hereinafter.

BRIEF DESCRIPTION OF THE DRAWINGS

In order that the manner in which the above recited and other benefits, advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

I. Introduction

A detailed description of the invention will now be provided with specific reference to figures illustrating preferred embodiments of the invention. It will be appreciated that like structures will be provided with like reference designations.

The present invention is directed to a sludge harvester for removing a concentrated nutrient sludge from sludge ponds. The harvester is intended to be relatively inexpensive to operate, while allowing the user to retrieve a high nutrient sludge product from sludge ponds so as to yield a valuable fertilizer product.

II. An Exemplary Sludge Harvester

Figure 1A:
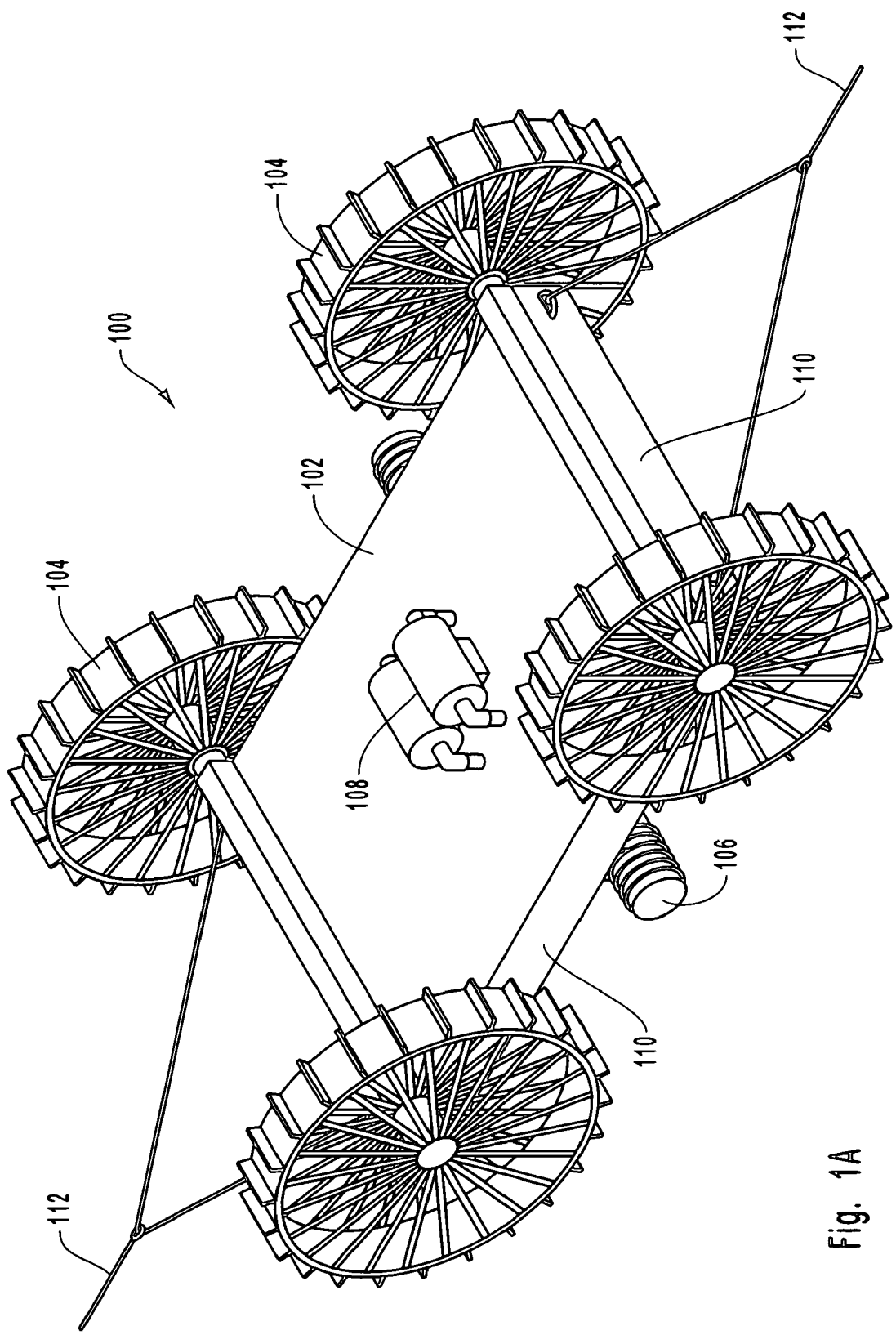
FIG. 1A is a perspective view of one embodiment of a sludge harvester according to the present invention.
Figure 1B:
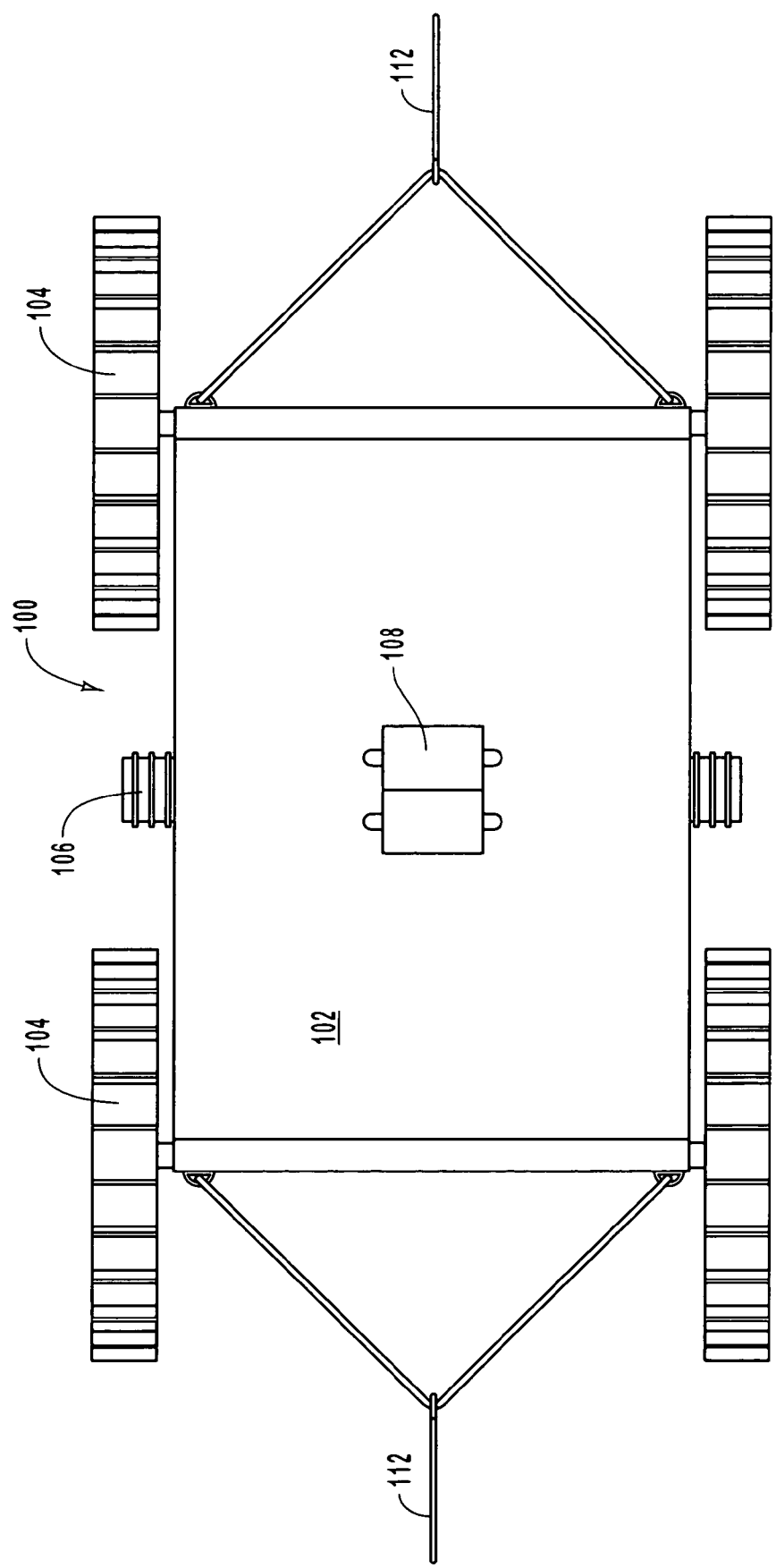
FIG. 1B is top view of the sludge harvester of FIG. 1A.

FIGS. 1A and 1B illustrate an exemplary embodiment of a sludge harvester according to the present invention. The sludge harvester 100 includes a frame 102, a plurality of wheels 104, a pin mixer 106, and a pump 108, and a plurality of sideboards 110.

In the illustrated embodiment, the frame 102 comprises a flat bed, while the wheels 104, the pin mixer 106, and the pump 108 are attached to the frame 102. The flat bed 102 also includes a plurality of sideboards 110. The sideboards 110 provide a baffle that serves to prevent vortexing of the dilute layer into the pump 108. Reducing turbulence, vortexing, and over-agitation of the sludge layer and the adjacent dilute layer during operation of the pin mixer 106 and pump 108 allows recovery of a higher nutrient sludge product.

Figure 1C:
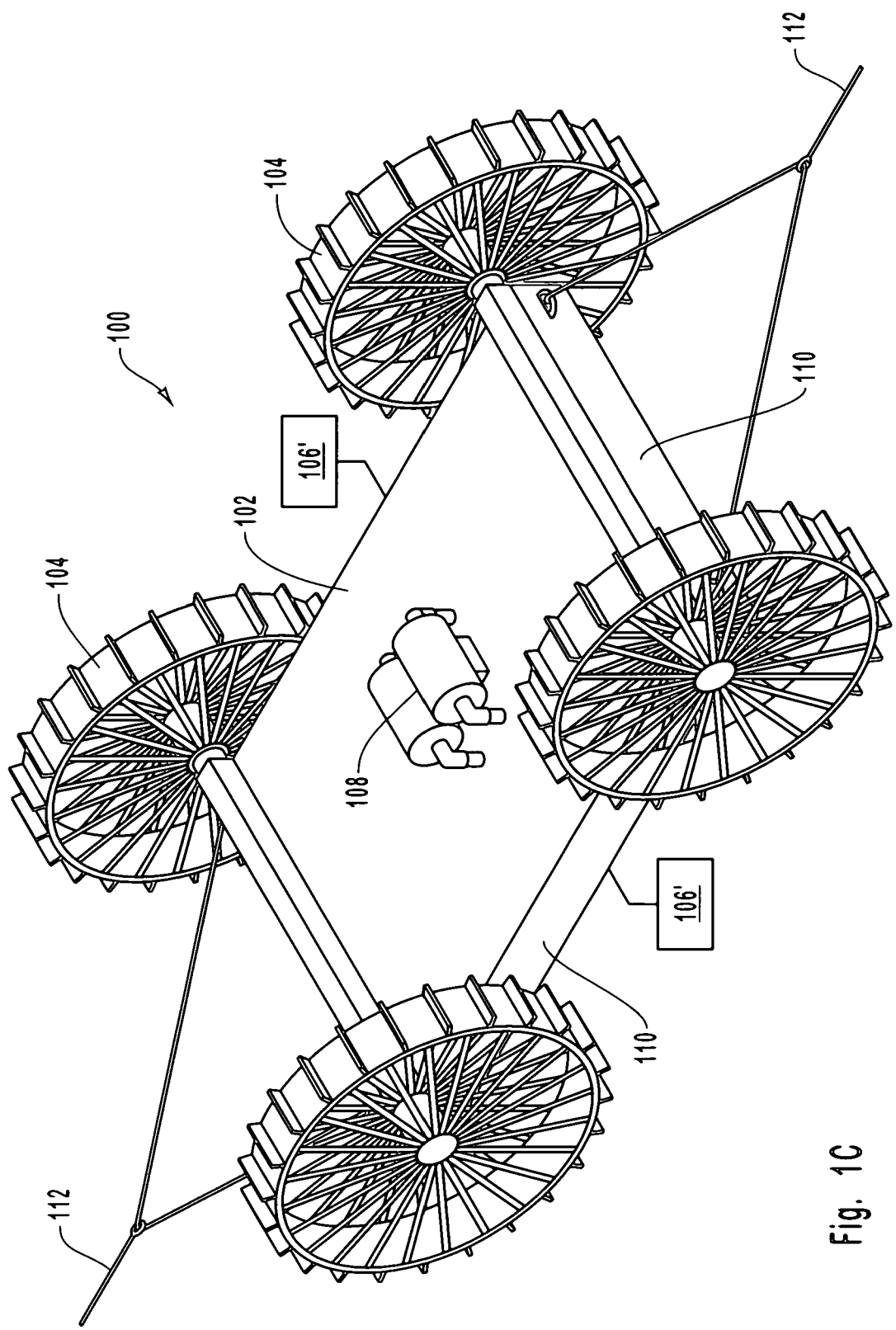
FIG. 1C is a perspective view of an alternative embodiment of a sludge harvester according to the present invention schematically depicting an auger used to gently break up a sludge layer in a sludge pond.

The means for gently breaking up at least a portion of the sludge layer may comprise any mechanical device capable of gently breaking up a portion of the sludge layer. The embodiment illustrated in FIGS. 1A and 1B includes a pin mixer 106, although other devices, for example, an auger (FIG. 1C) or a rake (FIG. 2A–2B) could alternatively be used. The means for gently breaking up a portion of the sludge layer is intended to just break up the surface of the sludge layer without overly agitating and mixing the material of the sludge layer with the adjacent liquid dilute layer. By keeping agitation and mixing to a minimum, the nutrient value recovered is maintained at a high level.

The means for capturing at least a portion of the broken up sludge layer may comprise any mechanical device capable of capturing a portion of the nutrient rich sludge layer. According to one embodiment, the means for capturing at least a portion of the broken up portion of the sludge layer may comprise pump 108 (e.g., a positive displacement pump). Because the sludge layer is gently broken up and over agitation is undesirable, the pump preferably removes the material of the sludge layer at a reduced rate as compared to alternative devices and techniques. According to one embodiment, the pump operates from about 50–150 gpm, preferably about 200 gpm or less, more preferably about 150 gpm or less, and most preferably about 100 gpm or less. For comparison sake, many traditional dredging devices operate at about 800 gpm, resulting in greatly increased agitation and mixing between the sludge layer and the dilute layer. The reduced capture rate of the sludge harvester results in significantly lower agitation of the sludge and dilute layers. This allows retrieval of a sludge product having a higher concentration of nutrients.

The sludge harvester 100 may also include a tow rope, chain, or cable 112 which is attached to frame 102. The illustrated embodiment includes a tow cable 112 attached to each end of the sludge harvester 100. Each tow cable 112 can be attached to a winch or other device placed at each end of the sludge pond. In operation, the winch or other device may be operated to pull the sludge harvester across the sludge pond at a desired rate. According to an alternative embodiment, the sludge harvester may be self-propelled, so as to include a motor.

Figure 2A:
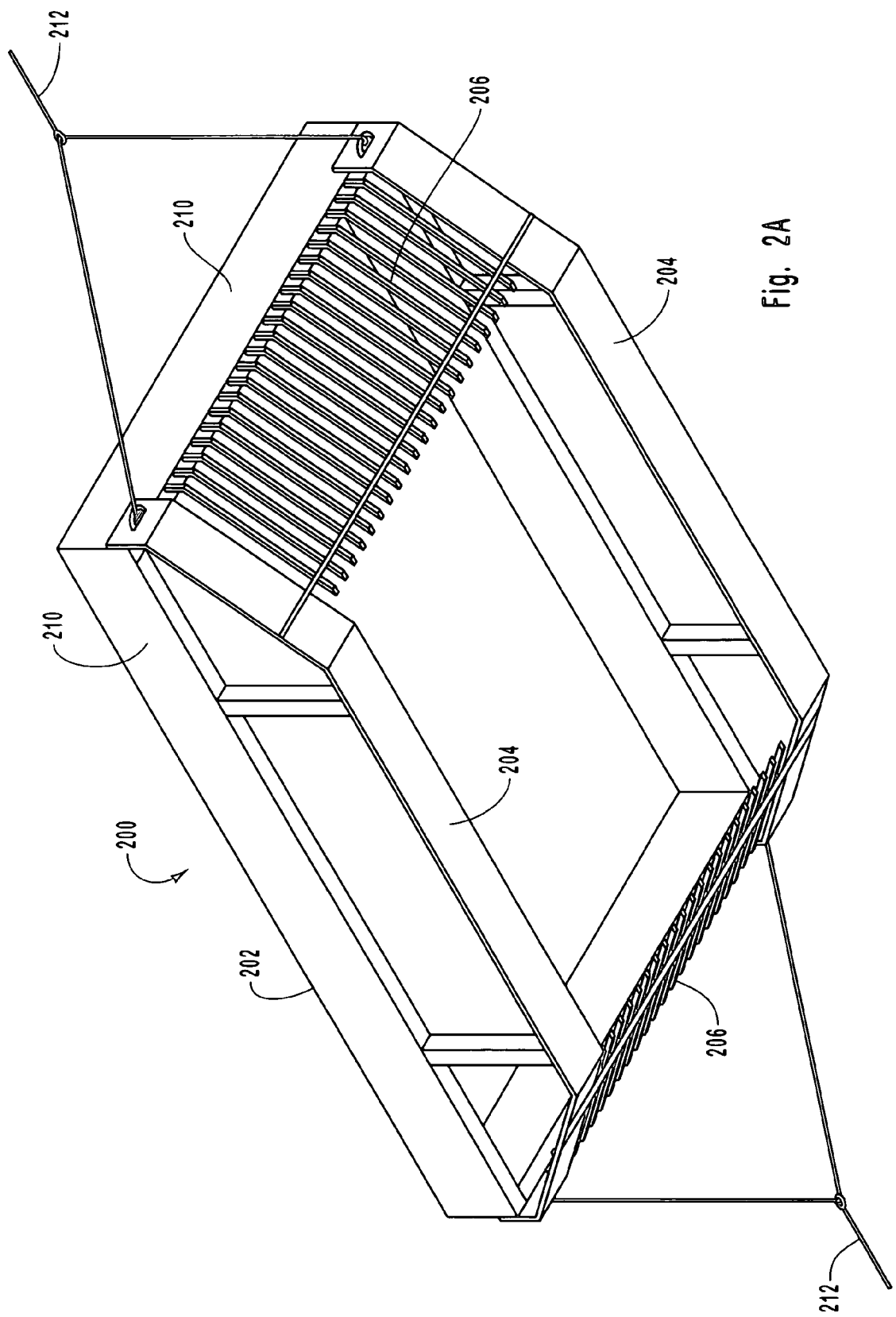
FIGS. 2A and 2B are different perspective views of an alternative embodiment of a sludge harvester.
Figure 2B:
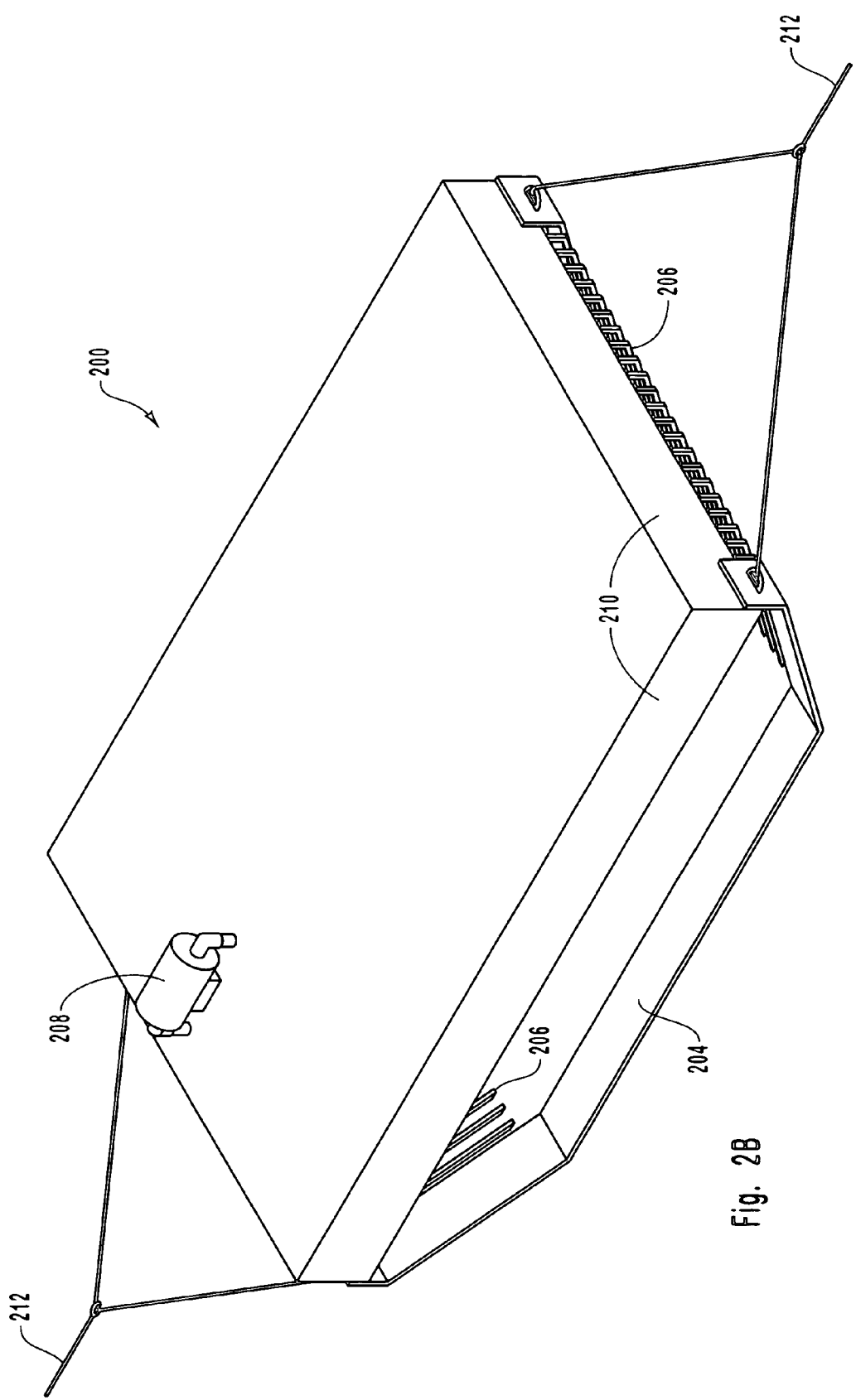

FIGS. 2A–2B illustrate an alternative sludge harvester 200 including a frame 202, skids 204, a rake 206, and a pump 208 (FIG. 2B). Sludge harvester 202 also includes sideboards 210 designed to reduce turbulence, vortexing, and mixing between the sludge layer and the dilute layer during operation. Rake 206 is an example of means for gently breaking up at least a portion of the sludge layer. Pump 208 is an example of means for capturing at least a portion of the broken sludge layer.

III. Exemplary Method of Use

Figure 3:
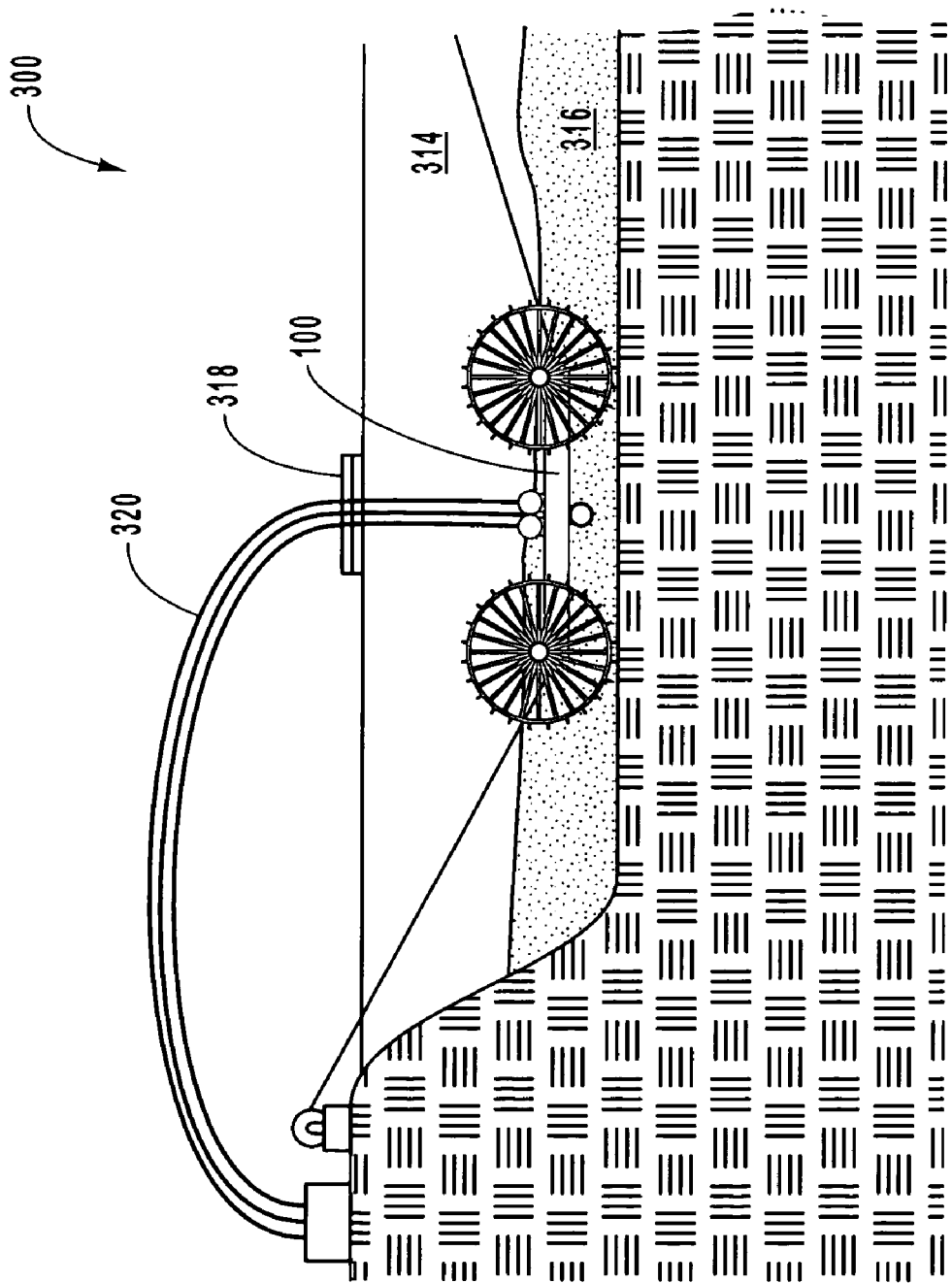
FIG. 3 is a perspective view of the sludge harvester of FIGS. 1A–1B in operation.

FIG. 3 illustrates the sludge harvester 100 in operation. The lagoon 300 includes a dilute layer 314 and a sludge layer 316. Although some nutrients are located in both layers, the vast majority of the nitrogen (N) potassium (K) and phosphates (P) are contained within the sludge layer 316. According to one embodiment, the sludge harvester 100 is operated in such a manner so as to capture a portion of the sludge layer without overly agitating the sludge layer and the dilute layer. The sludge harvester 100 accomplishes this by gently breaking up the sludge layer, rather than aggressively agitating and mixing both the sludge layer and the dilute layer. Operation in such a manner produces an organic sludge product having higher nutrient density than other techniques.

The sludge harvester 100 is introduced into lagoon 300. Because of the density of the sludge layer 316, the sludge harvester 100 will tend to sink at least partially into sludge layer 316.

A float 318 on the surface of lagoon 300 may be used to guide input and output lines 320 to the sludge harvester 100. For example, lines 320 may provide connections to the sludge harvester 100 to provide air for the pump 108, exhaust from the pump 108, and organic sludge product delivery from the pump 108.

The organic sludge product retrieved by the sludge harvester 100 comprises a portion of the sludge layer 316. The organic sludge product may be applied directly as an organic fertilizer product to agricultural land, or the organic sludge product may be processed to produce a wet or dry organic fertilizer product.

It will also be appreciated that the present claimed invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A sludge harvester for removing a concentrated sludge from a sludge pond that includes an aqueous dilute layer and a more concentrated sludge layer, the sludge harvester comprising:
   a frame having an outer perimeter comprised of a plurality of sideboards and an interior portion at least partially bounded by said sideboards;
   one or more wheels or skids attached to said frame;
   means, at least partially disposed within said interior portion of said frame, for breaking up at least a portion of a sludge layer adjacent to an aqueous dilute layer while minimizing agitation of the sludge layer and mixing of the sludge layer with the adjacent aqueous dilute layer;
   means, at least partially disposed within said interior portion of said frame, for preferentially capturing at least a portion of a broken up sludge layer rather than the adjacent aqueous dilute layer; and
   means, communicating with said capturing means, for transporting captured sludge from within said frame to a location outside of a sludge pond during use.

2. A sludge harvester as recited in claim 1, wherein said frame includes a flat bed.

3. A sludge harvester as recited in claim 2, wherein said flat bed in combination with said plurality of sideboards at least partially bounds said interior portion of said frame so as to reduce at least one of vortexing, turbulence, and mixing.

4. A sludge harvester as recited in claim 1, wherein said means for breaking up at least a portion of a sludge layer comprises a pin mixer.

5. A sludge harvester as recited in claim 1, wherein said means for breaking up at least a portion of a sludge layer comprises an auger.

6. A sludge harvester as recited in claim 1, wherein said means for breaking up at least a portion of a sludge layer comprises a rake having a plurality of spaced-apart teeth attached to said frame and which generally point downward relative to said frame in order to cut through and break up a sludge layer when the sludge harvester is pulled through a sludge pond.

7. A sludge harvester as recited in claim 1, wherein said means for capturing at least a portion of a broken up sludge layer comprises a pump positioned on said frame so that an inlet of said pump into which sludge is captured is submerged within the sludge layer of the sludge pond when the sludge harvester is in use.

8. A sludge harvester as recited in claim 7, wherein said pump is designed so as to pump about 200 gallons per minute or less during use.

9. A sludge harvester as recited in claim 7, wherein said pump is designed so as to pump about 150 gallons per minute or less during use.

10. A sludge harvester as recited in claim 7, wherein said pump is designed so as to pump about 100 gallons per minute or less during use.

11. A sludge harvester as recited in claim 1, wherein the sludge harvester is designed so as to be self-propelled.

12. A sludge harvester as recited in claim 1, further comprising at least one of a tow rope, a chain, or a cable for pulling the sludge harvester through a sludge pond during use.

13. A sludge harvester for removing a concentrated nutrient sludge from a sludge pond that includes an aqueous dilute layer and a more concentrated sludge layer, the sludge harvester comprising:
   a frame;
   one or more wheels or skids attached to said frame that support said frame when the sludge harvester is pulled through a sludge pond;
   at least one of a pin mixer, auger or rake having a plurality of spaced-apart teeth attached to said frame and which generally point downward relative to said frame designed and positioned so as to break up at least a portion of a sludge layer adjacent to an aqueous dilute layer while minimizing agitation of the sludge layer and mixing of the sludge layer with the adjacent aqueous dilute layer when the sludge harvester is in use; and
   at least one suctioning pump designed and positioned on said frame so that an inlet of said pump is positioned so as to preferentially capture a broken up sludge layer rather than the adjacent aqueous dilute layer.

14. A sludge harvester as recited in claim 13, wherein said pump is designed so as to pump a volume in a range of about 50 to about 150 gallons per minute during use.

15. A sludge harvester as recited in claim 13, wherein said frame further includes a flat bed and a plurality of sideboards that at least partially define an interior portion in which said pump inlet is positioned so as to reduce at least one of vortexing, turbulence, and mixing that might otherwise cause substantial mixing of the sludge layer and the adjacent aqueous dilute layer.

16. A method of processing a concentrated nutrient sludge from a sludge pond, comprising:
   providing a sludge harvester as recited in claim 1;
   introducing said sludge harvester into a sludge pond having a dilute layer and a sludge layer; and
   operating said sludge harvester so as to recover a sludge product comprising a portion of the sludge layer.

17. A method as recited in claim 16, wherein said recovered sludge product has a high concentration of soluble nutrients.

18. A method as recited in claim 16, wherein operation of said harvester is at least partially automated.

19. A method as recited in claim 16, further comprising removing water from said sludge product to yield a wet or dry organic fertilizer product.

20. A method as recited in claim 16, further comprising applying said sludge product onto agricultural land.

21. A sludge harvester for removing a concentrated nutrient sludge from a sludge pond that includes an aqueous dilute layer and a more concentrated sludge layer, the sludge harvester comprising:
- a frame having a flat bed;
- one or more wheels or skids attached to said frame;
- means for breaking up at least a portion of a sludge layer adjacent to an aqueous dilute layer while minimizing agitation of the sludge layer and mixing of the sludge layer with the adjacent aqueous dilute layer; and
- a pump attached to said frame for capturing at least a portion of a broken up sludge layer, wherein said pump is designed to pump about 200 gallons per minute or less during use, wherein an inlet of said pump through which sludge is captured is positioned beneath said flat bed in order to preferentially capture a broken up sludge layer rather than the adjacent aqueous dilute layer.

22. A sludge harvester for removing a concentrated nutrient sludge from a sludge pond, comprising:
- a frame;
- one or more wheels or skids attached to said frame;
- at least one of a pin mixer, auger or rake having a plurality of spaced-apart teeth attached to said frame and which generally point downward relative to said frame designed and positioned so as to break up at least a portion of a sludge layer adjacent to a dilute layer while minimizing agitation of the sludge layer and mixing of the sludge layer with the adjacent aqueous dilute layer when the sludge harvester is in use; and
- at least one pump designed so as to pump a volume of about 200 gallons per minute or less during use and having an inlet positioned so as to preferentially capture at least a portion of a broken up sludge layer rather than the adjacent aqueous dilute layer.

* * * * *